United States Patent Office 3,028,407
Patented Apr. 3, 1962

3,028,407
SUBSTITUTED ETHYLENEDIAMINE COMPOUNDS HAVING AROMATIC RINGS
Martin Knell, Yorktown Heights, N.Y., and Harry Kroll, Warwick, R.I., assignors to Geigy Chemical Corporation, a corportaion of Delaware
No Drawing. Filed Apr. 18, 1958, Ser. No. 729,263
15 Claims. (Cl. 260—439)

This invention is that of ethylene bis(alpha-imino-orthohydroxyphenylacetic acid)-monoamide, and its dihydrochloride, and derivatives of both thereof wherein (a) at least one of the hydrogens on either or both of the ethylene carbons is replaced by (i) an alkyl group especially a lower alkyl such as methyl or ethyl, or (ii) a hydroxyalkyl group particularly a lower hydroxylalkyl group such as the ethanol or hydroxyethyl group (—$C_2H_4OH$), or (iii) a divalent lower alkylene group, such as a lower alkylene group as the divalent tetramethylene group, —$CH_2.CH_2.CH_2.CH_2$—, and simultaneously linked to both of the ethylene carbons by replacing a hydrogen on each of them respectively and thereby forming with both of them a saturated six carbon ring having the two imino nitrogens still linked respectively separately to adjacent carbons, and the relative position of these nitrogens with respect to each other may be cis or trans; or (b) at least one of the four other hydrogens on at least one, and preferably both, of the benzene nuclei is replaced by a substituent group that is inert to, i.e. does not react with, a primary amine, that is to say a substituent group that is free of a functional carbonyl group such as is in the keto and aldehyde groups, for example, alkyl (having less than eleven carbon atoms) and especially lower alkyl, lower hydroxyalkyl, lower alkoxy, carboxyl, alkali metal or ammonium carboxylate, hydroxyl, O-alkali metal (i.e. the hydroxyl group with its hydrogen replaced by an alkali metal), sulfo, alkali cation sulfonate, nitro, amino, or a cyano group, or a halogen radical; and especially with both of the benzene nuclei being identically substituted; or (c) both types of the substitutions (a) and (b) are present at the same time in the compound.

Certain of the substituent groups that can replace one or more of the hydrogens of the benzene nuclei may be referred to in classes, for example, the alkyl and hydroxyalkyl groups can be referred to as a substituent containing a lower alkyl group; the carboxyl and alkali cation carboxylate groups can be referred to as a substituent containing the carbonyloxy group

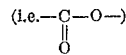

the sulfo and alkali cation sulfonate groups can be referred to as a substituent containing the group or radical —$SO_3$—; the hydroxyl, alkoxy, and O-alkali metal can be referred to as a substituent containing an oxy group; and the nitro, amino, and cyano groups can be referred to as a substituent containing nitrogen or a substituent composed of nitrogen and only one other element.

Thus, the invention includes also various types of alkali cation salts of ethylene bis(alpha-imino-orthohydroxyphenylacetic acid)-monoamide and of any of its various above described derivatives. Among these various types of salts are those formed with the sole acetic acid carboxyl group or with any carboxyl and/or sulfonic acid group on either or both of the benzene rings. These several types of salts include those with an alkali cation which is intended to include the alkali metal salts as the sodium and potassium salts, and also the ammonia-derived salts such as the ammonium salt and amine salts as those of primary, secondary and tertiary amines, for example, alkyl amines especially lower alkyl amines as methyl-, ethyl-, dimethyl- and diethylamines, as well as hydroxyalkylamines also called alkanolamines such as the lower alkanolamines as mono-, di- or trialkanolamines illustrated by mono-, di- or triethanolamine, or diamines such as ethylenediamine, as well as heterocyclic amines as morpholine.

So also, a still further type of salt embraced by the invention is the alkali metal (e.g. sodium or potassium) phenolate type. This type, in addition to the possibility of having alkali cation carboxylate, and possibly also sulfonate, groups as described above, also has the hydrogen in at least the ortho-hydroxy group on at least one, and preferably both, of the benzene nuclei replaced by an alkali metal.

In this specification and the appended claims, lower alkyl, lower alkoxy, and lower hydroxyalkyl (which latter is also called lower alkanol) are those groups wherein the alkyl group has from one to six carbon atoms. The alkyl group that can replace a hydrogen on either or both of the benzene nuclei more often may not exceed ten carbon atoms.

Accordingly, the free bases of the various dihydrochloride products of the invention, including as well their various types of above indicated salts, are represented by the general formula

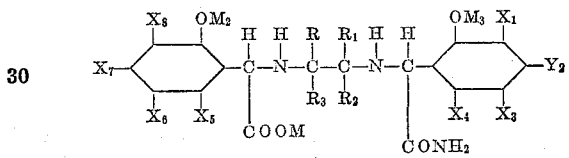

wherein R, $R_1$, $R_2$ and $R_3$ are separately selected from hydrogen, an alkyl group and especially a lower alkyl group or a hydroxyalkyl group and especially a lower hydroxyalkyl group, or R and $R_1$ or $R_2$ and $R_3$ respectively jointly are a divalent polyalkylene group forming a saturated ring with both of the ethylene carbons, all as described in the opening paragraph of this specification; $X_1$, $X_2$, $X_3$, $X_4$, $X_5$, $X_6$, $X_7$ and $X_8$ are independently individually selected from hydrogen and a substituent group that does not react with a primary amine, as defined in the first paragraph of this specification, and preferably with $X_1$, $X_2$, $X_3$ and $X_4$ being respectively the same as $X_8$, $X_7$, $X_6$ and $X_5$; and wherein M is independently selected from hydrogen and an alkali cation, that is to say an alkali metal or an ammonia-derived cation of the type described above and with its nitrogen atom linked to the oxygen of the carboxyl group; and wherein $M_2$ and $M_3$ are independently individually selected from hydrogen and an alkali metal, and generally preferably with $M_2$ and $M_3$ being the same.

The free bases of the dihydrochloride compounds of the invention, that is those wherein M, $M_2$ and $M_3$ in the general formula are hydrogen, are water-soluble. However, the derivatives wherein M is a mono-, di- or triethanolamine cation is water-soluble. So also are those wherein M is an alkali cation, as defined hereinabove, while also each of $M_2$ and $M_3$ is an alkali metal. Other water-soluble salts of the various derivatives are those wherein any of the substituents $X_1$ through $X_8$ is an alkali type sulfonate, i.e. an alkali metal sulfonate or a sulfonate of an ammonia-derived cation of the type described in the third paragraph of this specification.

The derivatives wherein M is an alkylamine or alkanolamine cation having a higher alkyl chain, i.e. over about six carbon atoms, as in the long chain primary amines which can be straight chain amines such as laurylamine, or branched chain, are soluble in organic solvents, for example, the lower aliphatic alcohols, and show some.

generally slight, solubility in hydrocarbon solvents such as solvent naphtha, benzene, toluene, and hexane, and in ethyl ether and other ethers.

The compounds of the invention are prepared by condensing one mole of an ethylenediamine with two moles of ortho-hydroxyzenzaldehyde otherwise unsubstituted or having on the benzene nucleus any such other substituent or substituents as is desired in the end product to be made from it, and under operating conditions to eliminate two moles of water for each mole of the ethylenediamine, and thereby to form the corresponding disalicylidene-ethylenediimine either further unsubstituted on the benzene ring or having on it the other particularly selected substituent or substituents that it was desired to have in the end product. The thus obtained particular disalicylideneethylenediimine then is treated with sufficient hydrogen cyanide to convert it to the corresponding ethylene bis(alpha-imino-ortho-hydroxyphenyl acetonitrile) which latter, after removal from its reaction medium, then is hydrolyzed under hydrolysis conditions that convert one of its nitrile groups to a carboxyl group and the other to the carboxamide group (i.e. —$CONH_2$).

The separated dinitrile is hydrolyzed by mixing it with concentrated hydrochloric acid, advantageously by adding the dinitrile with stirring to the required amount of that acid, to strongly acidify it, and controlling the heating up of the reaction mixture for its temperature not to exceed about 40° C., and preferably initially not to exceed about 30° C.; and after completing the mixing of the dinitrile, raising the temperature to about 40° C., or between about 40 and 45° C., and continuing the heating at about 40° to about 45° C. for a time sufficient for the desired monoamide-monoacid to be formed (as its dihydrochloride). Such time can be about four hours, for example, with the product of Example 1. The time can be correspondingly increased if the heating is conducted at any temperature under 40° C. It is the heating within this controlled range that enables the conversion to the monoamide. The completion of the conversion can be checked readily by simply analyzing for the content of amide nitrogen. This method including the controlled heating conditions for producing monoamide as dihydrochloride is also part of the invention.

The invention is illustrated by, but not restricted to, the following examples:

Example 1

*Preparation of ethylene bis(alpha-imino-ortho-hydroxyphenylacetic acid)-monoamide dihydrochloride from ethylene bis(alpha-imino-ortho-hydroxyphenyl acetonitrile).* —One mole of disalicylidene ethylenediimine, obtained from condensing two moles of salicylaldehyde and one mole of ethylenediamine, was placed in a three-liter three-necked flask fitted with a stirrer, reflux condenser (cooled with ice water) and thermometer. A mixture of seven hundred milliliters of liquid hydrogen cyanide, one hundred and eighty milliliters of water and two and one-half milliliters of hydrochloric acid was added rapidly while stirring the reaction mixture. Stirring was continued for three hours during which in place of the initially suspended golden yellow solid there was suspended in the reaction medium a light tan solid, namely, the ethylene bis(alpha-imino-ortho-hydroxyphenyl acetonitrile). This dinitrile then was filtered off. A sample, washed well with water and air dried, showed a melting point of 113–115° C. and neutral equivalent of 163 (calculated is 161) on titration with perchloric acid in glacial acetic acid; percent nitrogen found 17.17; calculated 17.38.

*Hydrolysis of the nitrile.*—One hundred and forty grams (0.434 mole) of ethylene bis(alpha-imino-ortho-hydroxyphenyl acetonitrile) were added with stirring portionwise to seven hundred milliliters of concentrated hydrochloric acid and the heating up of the reaction medium was controlled to keep it below 30° C. After the addition of the dinitrile was completed, the temperature of the reaction was increased to 40° C. A few minutes thereafter a solid separated out from the homogeneous mixture. The heating of the mixture then was continued at 40–45° for four hours. The ethylene bis(alpha-ortho-hydroxyphenyl acetic acid)-monoamide dihydrochloride that separated out then was filtered off and washed with acetone until the filtrate was free of color, and dried under vacuum. 163.6 grams of the dihydrochloride product were obtained (87% yield).

Analysis for $C_{18}H_{23}O_5N_3Cl_2$:

|  | N(amide) | N(total) | Cl |
| --- | --- | --- | --- |
| calculated | 3.2 | 9.7 | 16.4 |
| found | 3.4 | 9.4 | 16.6 |

Neutral equivalent (in dimethyl formamide using KOH) found 108 (calculated is 108).

Example 2

*Tetra - methylene ethylene bis(alpha - imino - ortho - hydroxyphenylacetic acid)-monoamide dihydrochloride.*— Tetra-methylene ethylenediamine was condensed with salicylaldehyde, in the ratio of one mole of the former to two moles of the latter, in known manner under conditions to eliminate two moles of water for each mole of tetra-methylene ethylenediamine. One mole of the resulting disalicylidenetetra-methylene ethylenediimine (or disalicylidene 1,2-cyclohexanediamine) was placed in a three liter three-necked flask as in the preceding example. A mixture of seven hundred milliliters of liquid hydrogen cyanide cantaining one hundred and eighty milliliters of water and two and one-half milliliters of concentrated hydrochloric acid was added, rapidly with stirring, to convert the diimine to tetra-methylene ethylene bis(alpha-imino-ortho-hydroxyphenyl acetonitrile). The temperature was maintained at 20–25° C. for six hours. The excess hydrogen cyanide was evaporated off, and the oily dinitrile residue then was added, with stirring, portionwise to a volume of concentrated hydrochloric acid equal to about five times its weight, and the heating up of the reaction medium was controlled to keep it below 30° C. After the addition of the dinitrile was completed, the temperature of the reaction mixture was raised to 40° and the hydrolysis of the dinitrile completed by heating at 40–45° for several hours as in Example 1, and the resulting monoamide dihydrochloride similarly was filtered, washed and dried.

Example 3

*Methylethylene bis(alpha - imino - ortho - hydroxyphenylacetic acid) - monoamide dihydrochloride.*—Propanediamine-1,2 was condensed with salicylaldehyde, in a ratio of one mole of the former to two moles of the latter, in known manner under conditions to eliminate two moles of water for each mole of methyethylenediamine. The resulting disalicylidenemethylethylenediimine then was treated in a three-necked flask as in the preceding example with a mixture of liquid hydrogen cyanide, water and hydrochloric acid to convert it to methylethylene bis(alpha-imino-ortho-hydroxyphenyl acetonitrile). The dinitrile produced then was filtered off, washed well with water, and air dried. The dried dinitrile was added portionwise with stirring to concentrated hydrochloric acid and hydrolyzed in the same manner as was the dinitrile in Examples 1 and 2. The resulting desired monoamide dihydrochloride then was separated, washed and dried as in the other examples.

Example 4

*Ethylene bis(alpha - imino-2-hydroxy-5-methyl-phenylacetic acid)-monoamide dihydrochloride.*—Five hundred and forty-four grams (4 moles) of 2-hydroxy-5-methylbenzaldehyde and eight hundred milliliters of ethylenedichloride were placed in a four-liter three-necked flask equipped with a stirrer, reflux condenser, and dropping funnel. To the mixture was added one hundred and twenty grams (2 moles) of anhydrous ethylenediamine at a rate to maintain the temperature of 30° C. After the addition was completed, the mixture was refluxed to remove by azeotropic distillation the water formed during the reaction. The reaction mixture then was cooled to 20° C. To the agitated reaction mixture there was added two hundred and forty grams of liquid hydrogen cyanide. After eight hours, a light yellow solid that had separated out was filtered off, and dried under vacuum at room temperature. Yield: four hundred and forty grams of ethylene bis(alpha-imino-2-hydroxy-5-methylphenyl acetonitrile).

Three hundred and fifty parts of this dinitrile then were added portionwise to fifteen hundred milliliters of concentrated hydrochloric acid while stirring and keeping the temperature below 30° C. Stirring was continued for several hours during which time the dihydrochloride of the monoamide separated out from the homogeneous mixture. The yield of this monoamide dihydrochloride was increased by concentrating the filtrate solution under vacuum and keeping the temperature below 30° C.

Analysis

| For $C^{20}H^{27}O^5N^3Cl^2$ | N(total) | Cl(titratable) |
| --- | --- | --- |
| calculated | 9.1 | 15.4 |
| found | 8.9 | 15.7 |

By replacing the 2-hydroxy-5-methylbenzaldehyde of Example 4 respectively by the stoichiometric equivalent of any other (mono- or poly-)alkyl, hydroxybenzaldehyde and following the procedure of that example, there is similarly prepared with 2-hydroxy-3,5-dimethylbenzaldehyde the corresponding ethylene bis(alpha-imino-2-hydroxy-3,5-dimethylphenylacetic acid)-monoamide dihydrochloride; and replacing it with 2-hydroxy-5-ethylbenzaldehyde there is obtained ethylene bis(alpha-imino-2-hydroxy-5-ethylphenylacetic acid)-monoamide dihydrochloride; and with 2-hydroxy-5-(tertiary)butylbenzaldehyde there is prepared ethylene bis(alpha-imino-2-hydroxy-5-tertiary-butylphenylacetic acid)-monoamide dihydrochloride; and with 2-hydroxy-5-octylbenzaldehyde there is formed ethylene bis(alpha-imino-2-hydroxy-5-octylphenylacetic acid)-monoamide dihydrochloride; and with 2-hydroxy-5-nonylbenzaldehyde there is formed ethylene bis(alpha-imino-2-hydroxy-5-nonylphenylacetic acid)-monoamide dihydrochloride; and similarly others.

Similarly, when in place of the alkyl-2-hydroxybenzaldehyde used in Example 4, ethylenediamine is reacted with a corresponding (mono- or poly-)halo-2-hydroxybenzaldehyde, there is obtained the corresponding ethylenediamine derivative with halogen on the benzene rings, as illustrated by, but not restricted to, the following:

Example 5

Ethylene bis(alpha-imino - 2 - hydroxy-5-chlorophenylacetic acid)-monoamide dihydrochloride.—A solution of three hundred and thirteen grams of 2-hydroxy-5-chlorobenzaldehyde in four hundred milliliters of ethylene chloride was placed in a two liter three-necked flask equipped with stirrer, dropping funnel and Dean-Stark trap for azeotropic distillation of the water formed in the reaction. To this solution was added sixty grams of anhydrous ethylenediamine at a rate that maintained the temperature at 30° C. After the addition was complete, the mixture was refluxed to remove by azeotropic distillation the water formed. The reaction mixture then was cooled to 20° C. and one hundred and twenty grams of liquid hydrogen cyanide were added with agitation. After eight hours, the light yellow solid that formed was filtered off and dried under vacuum at room temperature, yielding two hundred and forty grams of ethylene bis(alpha-imino-2-hydroxy-5-chlorophenylacetonitrile).

One hundred and ninety-five grams of this foregoing dinitrile then were added portionwise with stirring to seven hundred and fifty milliliters of concentrated hydrochloric acid, while maintaining the temperature below 30° C. After the addition was completed, the stirring was continued for several hours while maintaining the temperature below 30° C., during which time, from the homogeneous mixture there precipitated out the dihydrochloride of ethylene bis(alpha-imino-2-hydroxy-5-chlorophenylacetic acid)-monoamide which was filtered off. The yield of this dihydrochloride was increased by concentrating the filtrate solution under vacuum while keeping the temperature below 30° C. The additional amount of the dihydrochloride was added to the part which was first filtered off.

By replacing the 2-hydroxy-5-chlorobenzaldehyde of example 5 by its stoichiometric equivalent of any other suitable 2-hydroxy-(mono- or poly-)halobenzaldehyde and following the procedure of that example, there is obtained respectively the corresponding other ethylene bis(alpha-imino-2-hydroxy-(mono- or poly-)halophenylacetic acid)-monoamide dihydrochloride. For example, by replacing the example 5 substituted benzaldehyde by 2-hydroxy-3,5-dichlorobenzaldehyde there is similarly obtained ethylene bis(alpha-imino-2-hydroxy-3,5-dichlorophenylacetic acid)-monoamide dihydrochloride; with 2-hydroxy-4,5-dichlorobenzaldehyde there is prepared ethylene bis(alpha - imino-2-hydroxy-4,5-dichlorophenylacetic acid)-monoamide dihydrochloride; with 2-hydroxy-5,6-dichlorobenzaldehyde there is obtained ethylene bis-(alpha-imino-2-hydroxy-5,6 - dichlorophenylacetic acid)-monoamide dihydrochloride; then with 2-hydroxy-3,5,6-trichlorobenzaldehyde there is prepared ethylene bis-(alpha-imino-2-hydroxy-3,5,6-trichlorophenylacetic acid)-monoamide dihydrochloride; similarly using 2-hydroxy-5-bromobenzaldehyde there results ethylene bis(alpha-imino-2-hydroxy-5-bromophenylacetic acid) - monoamide dihydrochloride; and with 2-hydroxy-3,5-dibromobenzaldehyde there is obtained ethylene bis(alpha-imino-2-hydroxy-3,5-dibromophenylacetic acid)-monoamide dihydrochloride; then using 2-hydroxy-5-iodobenzaldehyde there results ethylene bis(alpha-imino-2-hydroxy-5-iodophenylacetic acid)-monoamide dihydrochloride; and likewise with 2-hydroxy-3,5-diiodobenzaldehyde there is obtained ethylene bis(alpha-imino - 2 - hydroxy-3,5-diiodophenylacetic acid)-monoamide dihydrochloride; and similarly others.

By replacing the salicylaldehyde in Examples 2 and 3 by the stoichiometrically equivalent amount of a 2-hydroxybenzaldehyde having linked to its benzene ring some other substituent group or groups inert to (i.e. that does or do not react with) a primary amine and which it is desired to have attached to the benzene ring in the end product sought, and by repeating the combination of steps of these several foregoing pertinent examples, there is obtained the corresponding ethylene bis(alpha-imino-ortho-hydroxyphenylacetic acid)-monoamide dihydrochloride with the corresponding additional substituent or substituents on its benzene rings.

In the manner just indicated, with ethylenediamine:

2-hydroxy, 3-sulfobenzaldehyde yields ethylene bis(alpha-imino - ortho - hydroxy-meta-sulfophenylacetic acid)-monoamide dihydrochloride;
2-hydroxy-3-methoxybenzaldehyde yields ethylene bis (alpha - imino - ortho - hydroxy-meta-methoxyphenylacetic acid)-monoamide dihydrochloride;
2-hydroxy-3-hydroxyethylbenzaldehyde yields ethylene bis (alpha - imino-ortho-hydroxy-meta-hydroxyethylphenylacetic acid)-monoamide dihydrochloride;
2,4-dihydroxybenzaldehyde yields ethylene bis(alpha-imino-2,4-dihydroxyphenylacetic acid)-monoamide dihydrochloride;

2,6-dihydroxybenzaldehyde yields ethylene bis(alpha-imino-2,6-dihydroxyphenylacetic acid)-monoamide dihydrochloride;

2-hydroxy-3-nitrobenzaldehyde yields ethylene bis(alpha-imino - ortho - hydroxy - meta-nitrophenylacetic acid)-monoamide dihydrochloride;

2-hydroxy-3-aminobenzaldehyde yields ethylene bis(alpha-imino - ortho - hydroxy-meta-aminophenylacetic acid)-monoamide dihydrochloride;

2-hydroxy-3-carboxybenzaldehyde yields ethylene bis (alpha - imino-ortho-hydroxy-meta-carboxyphenylacetic acid)-monoamide dihydrochloride; and 2-hydroxy-5-carboxybenzaldehyde yields ethylene bis (alpha-imino-ortho - hydroxy - 5 - carboxyphenylacetic acid)-monoamide dihydrochloride.

Similarly, by using one mole of tetra-methylene ethylenediamine, or of a substituted ethylenediamine wherein a hydrogen linked to one of the ethylene carbons is replaced by an alkyl group e.g. methylethylenediamine, octylethylenediamine or dodecylethylenediamine, respectively separately with two moles of each of the different further substituted 2-hydroxybenzaldehydes included in the various preceding paragraphs, and following the steps of the corresponding preceding Examples 2 and 3 respectively, there are obtained respectively the corresponding individual tetra-methylene ethylene or methylethylene bis(alpha - imino-ortho-hydroxyphenylacetic acid)-monoamide dihydrochlorides having respectively the corresponding additional substituents on the phenyl nucleus as specifically shown in Examples 4 and 5, and by the replacement of the particular substituted benzaldehydes used respectively in these examples by any other of the substituted benzaldehydes disclosed above as suggested replacements for any of the specific substituted benzaldehydes used in any of these examples. All of these additional specific derivatives are incorporated herein by reference as if each of them was correspondingly separately actually individually set forth in full herein.

Any 5-alkyl, or 5-alkoxy, or 5-hydroxyalkyl (such as hydroxyethyl or hydroxypropyl), -2 - hydroxybenzaldehyde which may not be readily available for synthesizing a desired end product ethylene bis(alpha - imino, sub-stituted-phenylacetic acid) - monoamide dihydrochloride, readily can be prepared from the corresponding 5 - alkyl or 5 - alkoxy or 5 - hydroxyalkyl phenol to the corresponding 2 - hydroxy 5 - alkyl or - alkoxy or - hydroxyalkyl benzaldehyde by the Reimer-Tieman process described at page 37 of the fourth edition of Houben-Weyl "Methoden der organischen Chemie" (1954), Georg Thieme Verlag, Stutgart, Germany.

Any halogenated 2-hydroxybenzaldehyde which may not be readily available for synthesizing a desired end product ethylene bis(alpha - imino, halo - substituted - phenylacetic acid) - monoamide dihydrochloride can be prepared readily from the corresponding halogenated phenol, for example, the corresponding 4-halo or 2,4-dihalophenol, by converting the such required halogenated phenol to the desired halogenated 2-hydroxybenzaldehyde by either the above-mentioned Reimer-Tieman reaction or Gatterman aldehyde synthesis as described in A. R. Surrey's "Name Reactions in Organic Chemistry."

Thus, the various 2-hydroxybenzaldehydes having some other substitutents on the benzene ring, as illustrated by those in the full paragraph in column 6, lines 62 to 75 and column 7, lines 1–15, yield corresponding derivatives wherein three of $X_1$, $X_2$, $X_3$ and $X_4$ and three of $X_3$, $X_7$, $X_6$ and $X_5$ of the general formula in the sixth paragraph of this specification are hydrogen. Then, by reacting one mole of the ethylenediamine, or the ethylenediamine with lower alkyl or alkanol (i.e. hydroxyalkyl) substituents on any of its ethylene carbon atoms, with two moles of an ortho-hydroxybenzaldehyde having on its benzene ring two or more other substituents of the type disclosed anywhere in this specification, there are obtained the corresponding derivatives wherein each of at least two or more of $X_1$, $X_2$, $X_3$ and $X_4$ and also $X_8$, $X_7$, $X_6$ and $X_5$ is a substituents group rather than three of each of these two groups X's being hydrogen.

Likewise, by replacing the ethylenediamine or tetramethylene ethylenediamine or methylethylenediamine by some other differently substituted ethylenediamine, for example, where a hydrogen on each of the carbon atoms of the ethylene radical is replaced by a lower alkyl or lower alkanol (i.e., hydroxyalkyl such as hydroxy (lower) alkyl) group or a hydrogen on one of the ethylene carbons is replaced by an alkanol (i.e. hydroxyalkyl) group, and reacting one mole of such substituted ethylenediamine with two moles of any of the mono- or poly-further substituted ortho-hydroxybenzaldehydes and completing the procedures of any of the preceding applicable several examples, there result the corresponding other derivatives wherein R, $R_1$, $R_2$ and $R_3$ of the general formula are other substituents than those already described in relation to the specific examples.

While the general description, in the ninth paragraph of this specification, of the preparation of the monoamide dihydrochlorides of the invention, and the illustrative examples, show the reaction first between the particular ethylenediamine and the selected substituted salicylaldehyde and then converting the resulting diimine to its corresponding dinitrile, this order is not fixed. Thus, the selected salicylaldehyde may be reacted first with hydrogen cyanide to form the nitrile, two moles of which then can be reacted with one mole of the ethylenediamine to give the corresponding ethylene bis(alpha-imino-ortho-hydroxyphenyl acetonitrile). Then also, the hydrogen cyanide can be replaced by the equivalent quantity of an alkali metal cyanide such as sodium cyanide and the pH of the reaction mixture adjusted to provide the hydrogen cyanide equivalent.

For adjusting the pH in that step in the method as illustrated in the several examples, there can be used any suitable and compatible acid such as hydrochloric acid.

The free base of the dihydrochloride of each of the specific examples was prepared by stirring one-tenth of a mole of the dihydrochloride with one-fifth of a mole of sodium hydroxide dissolved in two hundred milliliters of water. The resulting free base showed good solubility in water. The corresponding free base of any other dihydrochloride produced by replacing the salicylaldehyde of any of the examples by some other substituted salicylaldehyde, or by replacing the ethylenediamine or substituted ethylenediamine by some other substituted ethylenediamine, is similarly prepared.

Any such resulting free base is converted to its alkali cation salt, especially to its carboxylate salt, such as its alkali metal, for example, sodium carboxylate, by adding to the aqueous solution of such free base one equivalent of an alkalizing agent, such as an alkali metal hydroxide, as sodium hydroxide.

Thus, by reacting any of these monoamide dihydrochloride covered by the invention with the required equivalent amount of the corresponding alkalizing agent such as an alkali metal or ammonium hydroxide or amine of the type described in the third paragraph of this specification, there is obtained the corresponding salt wherein M of the general formula is an alkali cation of the type above defined for M. For example, five grams of ethylene bis(alpha-imino-ortho-hydroxyphenylacetic acid)-monoamide dihydrochloride, briefly called "Compound I," was added to fifteen milliliters of 6 normal ammonium hydroxide and forty milliliters of water and stirred. When all of the Compound I was dissolved, the solution contained the ammonium salt of Compound I. Similarly, five grams of Compound I was added to a solution of seven and one-half milliliters of triethylamine in fifty milliliters of water and stirred. When all of the Compound I was dissolved, the solution contained the triethylammonium salt of Compound I. Any carboxyl group represented by any of $X_1$ through $X_8$ of the general formula can be converted simultaneously to the corresponding alkali cation salt by employing sufficient of the selected alkalizing agent.

In any of the derivatives wherein any of $X_1$ through $X_8$ is the sulfonic acid radical, addition of the alkalizing agent will convert it to the corresponding sulfonate group before any carboxyl group is changed to carboxylate. Then if carboxylates are also desired, sufficient alkalizing agent must be included to neutralize the carboxyl groups after the sulfonate groups are formed. Then to form phenolates by neutralization of the ortho hydroxyls, enough alkalizing agent must be added to make the pH greater than 10.

The various products of the invention are effective metal complexing agents in aqueous and non-aqueous media. The resulting complexes, especially iron (particularly ferric) chelates of the various products of the invention, are stable in strongly alkaline solutions.

Derivatives of the invention are also useful as fungicides and germicides, as oxidation inhibitors in hydrocarbons, in metal deactivation and in some solvent extraction applications. To illustrate: among the amine salts of the invention are substances effective for liquid extractions. For example, some such salts after sequestering a metal from an aqueous solution, form with it a complex that is soluble in an organic solvent that may not be soluble in water. Thus, such metal can be removed from an aqueous phase to an organic phase. Manganese in water solutions, for example, will form with an amine salt of ethylene bis(alpha-imino-ortho-hydroxy-phenylacetic acid) dihydrochloride a complex that is soluble in chloroform. That enables the removal or extraction of manganese from water into an organic solvent. The presence of higher alkyl groups (i.e. seven or more carbons) on the benzene groups of a derivative of the invention enhances its solubility and that of its metal chelates in organic solvents, thereby increasing the scope of their utility.

Where seen to be applicable and compatible, suitable mixtures of any of the free bases, dihydrochlorides, and alkali cation salts of the invention can be used jointly in various applications of them. Metal complexes or chelates made with derivatives of the invention are soluble in aliphatic and aromatic hydrocarbons and other organic solvents, for example, lower aliphatic alcohols, ketones, lower alkyl esters of lower alkyl alcohols, and acyclic ethers as ethyl ether, or cyclic ethers such as dioxane.

The derivatives of this invention, particularly as their water-soluble salts as described herein, very readily form metal complexes with divalent and other polyvalent metals, in addition to iron (ferric) and manganese already mentioned.

Thus, the invention embraces also such chelate complexes of polyvalent metals with the various monoamides described herein, whether taken as the free base or dihydrochloride or any of the herein mentioned salts of either form of them.

Embraced among such chelates of these various sequestering agents of this specification are those of divalent metals such as the alkaline earth metals as barium, calcium, strontium, with magnesium included among them, and the iron group metals iron, nickel, and cobalt, and others such as copper, zinc, and manganese as well as other divalent metals. The chelate complexes of higher than divalent metals are not only those with metals such as iron, cobalt, and manganese and others like them that also exist in the divalent state, but also those with metals that are only trivalent such as aluminum, as well as those of metals of any other valence. It is possible to have the chelate complex of any of the metals so long as it is divalent or higher.

In these chelate complexes with a polyvalent metal, the linkage of that metal is by replacement not only of the hydrogen of the carboxyl group of the acetic acid residue of the compound, but also of the hydrogen of the phenolic ortho-hydroxyl group.

Preparation of the chelate complexes as embraced by the invention, is illustrated by, but not restricted to, the following example.

*Example 6*

*Ferric chelate of ethylene bis(alpha-imino-orthohydroxyphenylacetic acid)-monoamide.*—Two hundred and twenty-one grams (0.5 mole) of ethylene bis(alpha-imino-ortho-hydroxyphenylacetic acid)-monoamide dihydrochloride were stirred up in one liter of water. While stirring that slurry, there was added one hundred and thirty-five grams (0.5 mole) of powdered ferric chloride (hexahydrate), which immediately produced a deep reddish-purple color. Then there was added two hundred grams of a fifty percent solution of sodium hydroxide (2.5 moles), and the exothermic reaction was cooled by immersing the reaction vessel in a cold-water-bath.

After the reaction was completed, the precipitated (solid) chelate was filtered off, washed to remove water-soluble salts of the reaction and dried. Because of the proportion of sodium hydroxide used, the end product was the ferric chelate of ethylene bis(alpha-imino-ortho-hydroxyphenylacetic acid)-monoamide.

The corresponding ferrous chelate is similarly prepared, but due to its ready oxidation to the ferric chelate, it is best prepared in an inert atmosphere (using, for example, carbon dioxide or nitrogen). Instead of the iron chloride, any other water-soluble iron salt (either ferric of ferrous depending on the particular chelate desired) can be used, such as the sulfate, nitrate, or acetate. Any of them can be added in powdered form or dissolved in water.

The corresponding chelate with any other polyvalent metal is prepared by using a corresponding water-soluble salt of it and following the same or similar procedure.

The iron chelate, particularly ferric, can be used by being applied on calcareous soils to overcome an iron deficiency in growing plants susceptible to such deficiency, for example, chlorosis. The finely divided chelate can be dusted over the soil around the plant, or admixed with plant food chemicals.

Thereby such iron chelate can be used to overcome an iron deficiency in a growing plant by a method which comprises administering to the plant an iron chelate, advantageously the ferric, chelate of ethylene bis(alpha-imino-ortho-hydroxyphenylacetic acid)-monoamide and in a quantity sufficient to overcome such deficiency.

Accordingly, the invention includes also the method of overcoming an iron deficiency in a growing plant by administering to the plant an iron chelate of any of the monoamide compounds of this invention and at a regimen sufficient to overcome the deficiency in relation to the particular soil wherein the plant is growing.

In addition to administering the chelate complex in powdered form or admixed with some plant food chemical or chemicals, it may be incorporated in any other vehicle innocuous to the plant, for example, a plant fertilizer composition. Alternatively, the iron chelate can be incorporated in an inert carrier or vehicle, for example, any innocuous sand such as vermiculite or others, or a liquid vehicle such as water.

For use in dry form, a mixture can be prepared containing one part of the iron chelate of the monoamide of Example 1 with ten parts of a balanced fertilizer such as the 13-0-13 (N-P-K) analysis fertilizer. That composition can be used, for example, on citrus trees to the extent of five pounds per tree.

Instead of the dihydrochloride of any of the monoamides of this invention, some other dihydrohalide, such as the dihydrobromide, or any other compatible acid addition salt, is prepared by adding the stoichiometric equivalent quantity of the particular acid to the free base (prepared, for example, as described in column 8, lines 41–51, inclusive, above). Alternatively, the dihydrobromide can be prepared by using concentrated hydrobromic acid in place of the concentrated hydrochloric acid in the procedure for hydrolyzing the dinitrile (for example, column 3, line 70 above).

While the invention has been described in relation to various specific embodiments of it, many modifications and substitutions in them can be made within the scope of the appended claims which are intended also to cover equivalents of them and the many variations indicated to be possible.

This application is a continuation-in-part of our co-pending application Serial No. 682,580, filed October 10, 1955, which in turn is a continuation-in-part of our then co-pending application Serial No. 358,558 filed May 29, 1953, now abandoned.

What is claimed is:

1. A member of the class consisting of (a) a monoamide having the indicated general formula

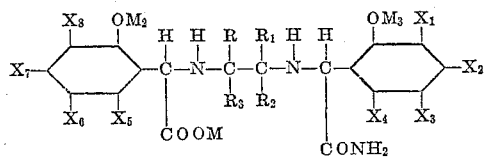

wherein any of R through $R_3$ is separately a member of the class consisting of hydrogen, an alkyl group having under 13 carbon atoms, a hydroxy (lower) alkyl group, and a divalent lower polyalkylene group having under 5 carbon atoms substituted for one of the pairs of R and $R_1$ and of $R_2$ and $R_3$; and any of $X_1$ through $X_8$ is separately a member of the class consisting of hydrogen, an alkyl group with one through ten carbon atoms, a lower alkoxy, lower hydroxyalkyl, carboxyl, alkali cation carboxylate, hydroxyl, alkali metal-oxy, nitro, free amino, cyano, sulfo, alkali metal sulfonate group, and a halogen; and M is independently selected from the class consisting of hydrogen and an alkali cation; and any of $M_2$ and $M_3$ is independently selected from hydrogen and an alkali metal (b) an acid addition salt of said monoamide; and (c) a polyvalent metal chelate of a member of the class consisting of (a) and (b); and wherein the alkali cation is a member of the class consisting of an alkali metal, ammonium, morpholino, and the radicals —$NH_2Q$, —$NHQ_2$, —$NQ_3$, wherein Q is a member of the class consisting of a lower alkyl and a (lower)alkylenediamino group.

2. A substance as claimed in claim 1, wherein each of $M_2$, $X_8$, $X_7$, $X_6$, and $X_5$ is correspondingly in sequence the same as $M_3$, $X_1$, $X_2$, $X_3$ and $X_4$ respectively.

3. An acid addition salt or ethylene bis(alpha-imino-ortho-hydroxy-phenylacetic acid)-monoamide.

4. A dihydrohalide of ethylene bis(alpha-imino-ortho-hydroxy-phenylacetic acid)-monoamide.

5. A dihydrochloride of ethylene bis(alpha-imino-ortho-hydroxy-phenylacetic acid)-monoamide.

6. Ethylene bis(alpha-imino-ortho-hydroxy-phenylacetic acid)-monoamide.

7. Ethylene bis(alpha-imino-ortho-hydroxy-(lower)-alkylphenylacetic acid)-monoamide dihydrochloride.

8. Ethylene bis(alpha-imino-ortho-hydroxy-5-methylphenylacetic acid)-monoamide dihydrochloride.

9. An iron chelate of ethylene bis(alpha-imino-ortho-hydroxyphenylacetic acid)-monoamide.

10. The ferric chelate of ethylene bis(alpha-imino-ortho-hydroxy-phenylacetic acid)-monoamide.

11. The method of hydrolyzing an ethylene bis(alpha-imino-ortho-hydroxyphenyl acetonitrile) to its corresponding ethylene bis(alpha-imino-ortho-hydroxyphenylacetic acid)-monoamide, which method comprises mixing the acetonitrile in a concentrated hydrohalide acid and controlling the heating of the reaction mixture to avoid exceeding about 40° C. while the acetonitrile and the acid are being admixed, and thereafter heating the mixture at between about 40 to about 45° for the several hours sufficient for the hydrolysis to the monoamide dihydrohalide to be completed.

12. The method as claimed in claim 11, wherein the hydrohalide acid is hydrochloric acid.

13. The method as claimed in claim 12, wherein the heating up of the reaction mixture is controlled below 30° C. while the acetonitrile and the acid are being admixed, and thereafter the temperature is raised to about 40° C. and continued between about 40° and 45° until the hydrolysis is completed.

14. A dihydrohalide of ethylene bis(alpha-imino-ortho-hydroxy-5-chlorophenyl-acetic acid)-monoamide.

15. A dihydrochloride of ethylene bis(alpha-imino-ortho-hydroxy-5-chlorophenyl-acetic acid)-monoamide.

References Cited in the file of this patent

UNITED STATES PATENTS

| | | |
|---|---|---|
| 2,655,532 | Hopff et al. | Oct. 13, 1953 |
| 2,683,658 | Saunders et al. | July 13, 1954 |
| 2,772,151 | Niketin | Feb. 20, 1956 |
| 2,824,128 | Dexter | Feb. 18, 1958 |
| 2,921,847 | Knell et al. | Jan. 19, 1960 |

UNITED STATES PATENT OFFICE
CERTIFICATE OF CORRECTION

Patent No. 3,028,407                          April 3, 1962

Martin Knell et al.

It is hereby certified that error appears in the above numbered patent requiring correction and that the said Letters Patent should read as corrected below.

Column 1, line 11, for "orthohydroxyphenylacetic" read -- ortho-hydroxyphenylacetic --; lines 51 and 52, after the formula insert a semicolon; column 2, lines 27 to 33, extreme right-hand portion of the formula, for "$-Y_2$" read -- $-X_2$ --; column 3, line 6, for "ortho-hydroxyzenzaldehyde" read -- ortho-hydroxybenzaldehyde --; column 4, line 33, for "cantaining" read -- containing --; lines 56 and 57, for "methyethylenediamine" read -- methylethylenediamine --; column 5, in the table, heading to column 1 thereof, for "For $C^{20}H^{27}O^5N^3Cl^2$" read -- For $C_{20}H_{27}O_5N_3Cl_2$ --; column 8, line 3, for "substituents" read -- substituent --; line 4, after "groups" insert -- of --; column 10, line 8, for "-orthohy-", in italics, read -- -ortho-hy- --, in italics; column 12, line 3, for "or" read -- of --.

Signed and sealed this 4th day of September 1962.

(SEAL)
Attest:
ERNEST W. SWIDER
Attesting Officer

DAVID L. LADD
Commissioner of Patents